United States Patent [19]

Narayan et al.

[11] Patent Number: 5,255,108
[45] Date of Patent: * Oct. 19, 1993

[54] METHOD OF MAXIMIZING THE FREQUENCY OF ADJACENT FACET CROSS SCAN ERROR SUCH THAT THE INCREASED SPATIAL FREQUENCY REDUCES THE VISUAL PERCEPTION OF THE EXPOSURE ERROR

[75] Inventors: Badhri Narayan; James E. Roddy, both of Rochester, N.Y.

[73] Assignee: Eastman Kodak Company, Rochester, N.Y.

[*] Notice: The portion of the term of this patent subsequent to Oct. 12, 2010 has been disclaimed.

[21] Appl. No.: 874,789

[22] Filed: Apr. 27, 1992

[51] Int. Cl.$^5$ .............................................. G02B 5/32
[52] U.S. Cl. .................................... 359/18; 359/25; 359/209; 359/900
[58] Field of Search ................... 359/15, 16, 17, 18, 359/206, 209, 25, 900

[56] References Cited

U.S. PATENT DOCUMENTS 4,455,061  6/1984  Case .
4,747,646  5/1988  Andrews .
4,787,688  11/1988  Rumfola .

*Primary Examiner*—Martin Lerner
*Assistant Examiner*—D. Collins
*Attorney, Agent, or Firm*—Dennis R. Arndt; Mark Z. Dudley

[57] ABSTRACT

By modifying the exposure sequence of the facets in a hologon during manufacture, it is intended to maximize the spatial frequency of the error especially in hologons having large numbers of facets so that the error frequency is multiplied by a large factor, thereby greatly reducing the eye's ability to detect banding problems. This method also minimizes the adjacent facet error as far as is practical.

10 Claims, 8 Drawing Sheets

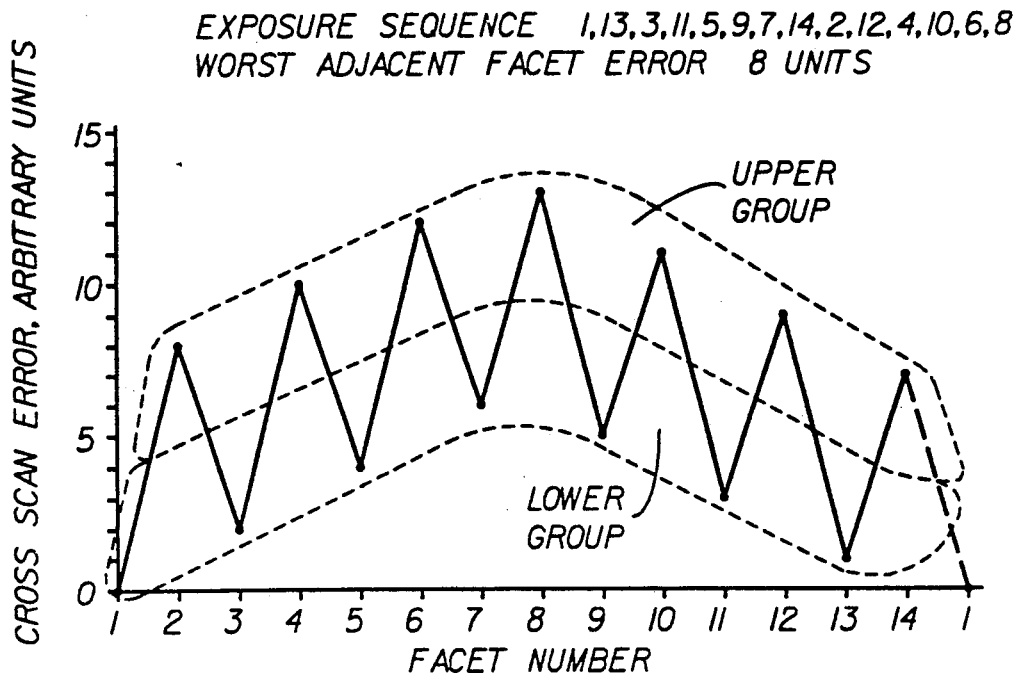
FIG. 9 CROSS SCAN ERROR FOR 14 FACET SCANNER
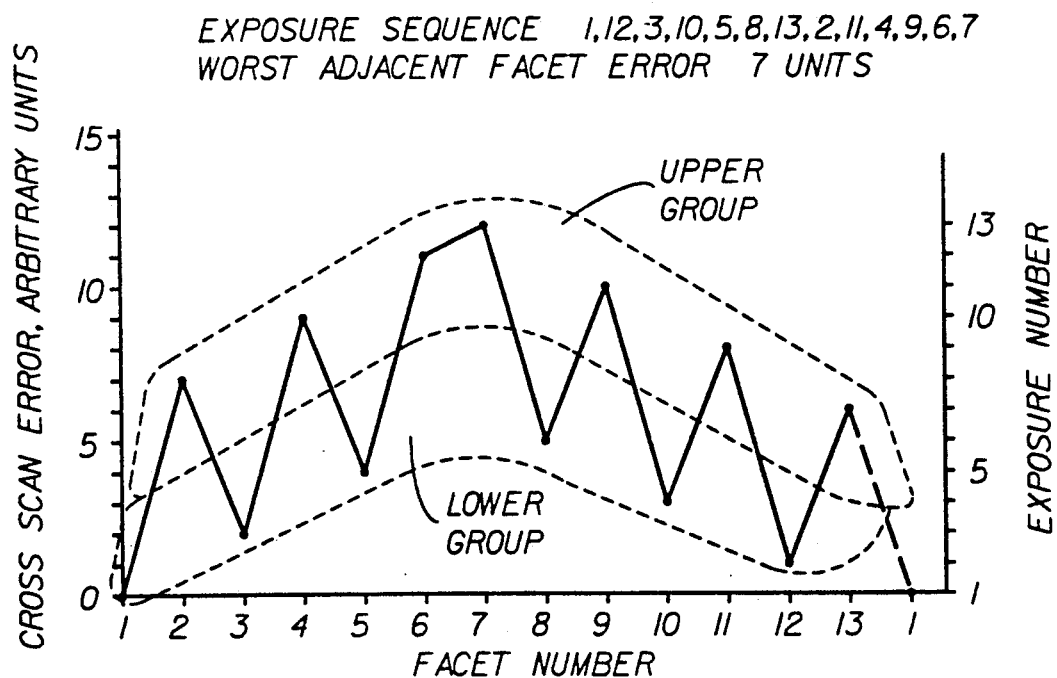
FIG. 10 CROSS SCAN ERROR FOR 13 FACET SCANNER

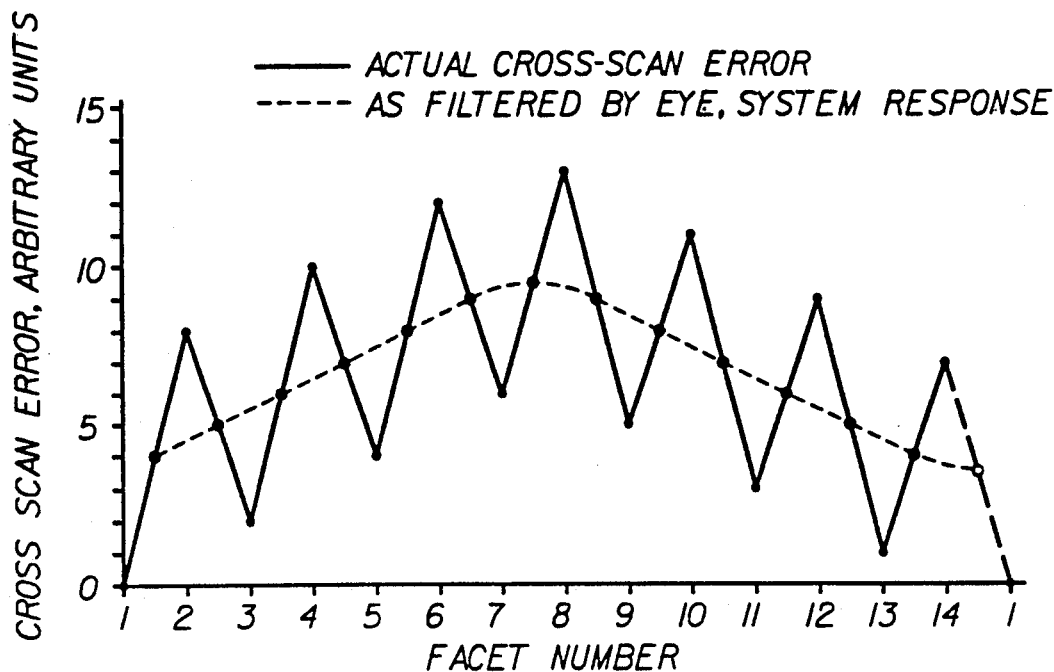
FIG.11 CROSS SCAN ERROR FOR 14 FACET SCANNER AS LOW PASS FILTERED BY EYE RESPONSE OR SYSTEM RESPONSE WITH A HIGH FREQUENCY CUTOFF
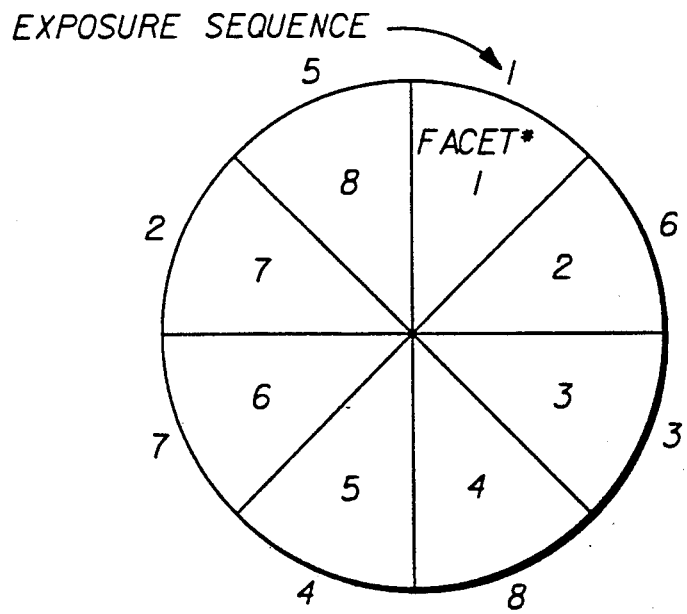
FIG.12 EXPOSURE SEQUENCE FOR INCREASING THE SPATIAL FREQUENCY OF CROSS-SCAN ERROR WHILE KEEPING ADJACENT FACET ERROR MODERATE

METHOD OF MAXIMIZING THE FREQUENCY OF ADJACENT FACET CROSS SCAN ERROR SUCH THAT THE INCREASED SPATIAL FREQUENCY REDUCES THE VISUAL PERCEPTION OF THE EXPOSURE ERROR

REFERENCE TO RELATED CASES

Reference is made herein to commonly-assigned, copending U.S. patent application Ser. No. 874,777, entitled "METHOD TO REDUCE CROSS SCAN ERROR VISIBILITY DURING MANUFACTURE OF A HOLOGON", in the names of B. Narayan and J. E. Roddy, filed concurrently herewith.

FIELD OF THE INVENTION

This invention relates generally to holography, and pertains more particularly to the manufacture of a multi-faceted holographic beam deflector element and method of making such an element so as to reduce cross scan error visibility.

BACKGROUND OF THE INVENTION

A hologon is a device which, when rotated, causes a stationary beam directed at it to repetitively scan along a line. Hologons comprise a disc mounted for rotation at high speed. The disc has, on a planar surface to which the axis of rotation is perpendicular, a plurality of sector-shaped facets. Each facet contains a diffraction grating. If there are "n" facets, the inclination of grating lines in one facet to the lines in adjacent facets (360/n)°. The lines may be tangential or "radial". If "radial", the lines of a facet are parallel to a radius which bisects the facet. If tangential, the lines are perpendicular to the radius which bisects the facet. The gratings may be reflective or transmissive. Multifaceted hologons having "n" facets cause "n" scans per revolution.

It is known to make a hologon by coating a disc with photoresist or other photosensitive material such as dichromated gelatin. A radiation beam, usually a laser beam is split and the resulting two beams are interfered at the photoresist coated so that the coating is exposed to a rectilinear interference pattern. The extend of the latent image created is limited by a mask which has an aperture bounded in part by two radially inner and radially outer boundaries and opposed lateral boundaries radial to the axis of rotation of the disc. The angle included between this line is the same as the included angle of the facet, i.e., (360/n)°. After one facet has been exposed, the disc is rotated through an angle of (360/n)° relative to the mask and means for directing the radiation beams at the disc, and another facet is exposed. After all "n" facets have been exposed, the coating disc is processed to produce operative gratings from the latent images in the photosensitive coating.

In various types of flying spot scanners, cross scan error, unwanted beam deviation perpendicular to the direction of beam scan, causes an undesirable artifact in the written image, termed banding. It is the nonuniform spacing of scan lines that causes the visual appearance of dark and light bands in an image area that would normally be a uniform gray level. Banding related to flying spot scanners comes primarily from two sources: facet-to-facet non-uniformity in reflectivity or diffraction efficiency, and facet-to-facet pointing error. This present invention deals exclusively with the latter. In mirror type scanners (polygons), the mirror facets are not parallel to the axis of rotation causing clustering and spreading of the written scan lines. A similar, but much reduced, problem occurs in hologons where the grating pitch varies slightly from facet-to-facet because of subtle changes that have occurred in the hologon fabrication fixture while the facets are being exposed. The consequence of non-uniform grating pitch from facet-to-facet on the hologon is non-uniform line spacing when the hologon is used in a laser writer.

Depending upon available laser power and photoresist sensitivity, each hologon facet takes many seconds to minutes for exposure. During the time for fabricating an entire disc, thermally induced drift in the laser cavity or in the exposure fixture can cause creep in the laser wavelength or fixture geometry. The result is slow drift in the grating pitch as successive facets are made. This drift can result in a ramp-like variation in cross scan error (FIG. 8) with successive facets around the disc. The error between adjacent facets is small until the large discontinuity between the last facet and the first facet. Such an error can produce noticeable banding because error between adjacent facets has the most effect on local exposure.

A number of methods are known in the art for correcting cross scan error in multifaceted rotating scanners. One method taught by Fleischer in U.S. Pat. No. 3,750,189 was to use combinations of cylindrical and toroidal lens elements to focus the beam on the mirror surface in one dimension and to relay that image to the final plane. This passive technique allows substantially more error in the scanning element, reducing the cost of the element itself, but toroidal lenses are difficult to make and align and the amount of correction afforded is limited in both scan angle and resolution. An active correction system for a hologon scanner such as acousto-optic or electro-optic deflection has been taught in U.S. Pat. No. 4,786,126 to Kramer. Use of such a system adds cost and complexity to the equipment and generally requires measurement and testing of each scanning element. Additional optics are often required to get the beam into and out of the deflection system.

The three patents cited below apply to the fabrication of hologon scanner discs and assume everything is perfect in the laser and exposure fixture and deal with other details of the exposure without altering the sequence of facet exposure as taught by the present invention.

U.S. Pat. No. 4,787,688 to Rumfola teaches a method to improve duty cycle by overlapping facets.

U.S. Pat. No. 4,455,061 describes a "facet" which is made up of a number of small areas of different plane wave (linear) holograms thereby providing a complex scan pattern with the "facet". The hologram is linearly translated, e.g., left to right to accomplish the scan and then must be reset to the original starting position. The reciprocating action required for this is slow, complex and generally suffers from a poor duty cycle when compared to the rotational motion that is more commonly employed. In a laser printer, a fast, linear scan with a large duty cycle is required. Arbitrary scans may be more useful in conjunction with optical memories, laser radars, or target designators. A linear scan could be accomplished using this technique. Because it uses numerically sequential exposure of facets and subfacets, the problem of thermal drift will be the same in the laser and exposure fixture as described previously.

U.S. Pat. No. 4,747,646 rotates a hologon disc mounted on a motor at high speed to gyroscopically stabilize it to eliminate decenter problems. Decenter is a major problem because of a focusing (nonlinear) hologon facet. A hologon made with a linear facet is very insensitive to such error and does not require such an expensive technique for facet exposure. The exposure appears to be sequential and there is nothing in the exposure sequence to compensate for thermal problems.

SUMMARY OF THE INVENTION

The present invention describes a method of reducing cross scan error visibility without special passive or active components. Only a modification of the facet exposure sequence during the manufacture of the hologon is required. Performance in terms of banding can be dramatically improved without requiring an increase in cost of the writing equipment.

The present invention provides a method of manufacturing a hologon, to maximize the spatial frequency of the cross scan error so as to greatly reduce the eye's ability to detect a banding problem. The hologon having an axis of rotation and a number of "n" greater than one, of generally sector-shaped facets uniformly disposed about said axis, the hologon being intended to have incident upon a substrate having a photosensitive layer receiving beams of radiation directed to the photosensitive layer to create an interference pattern on the layer in the sector-shaped facet. The improved method of manufacture comprising rotating the hologon through angular steps of $(360/n)°$ and then exposing the sector-shaped facets to the beams of radiation in the sequence of $1, n-1, 3, n-2, \ldots n, 2, n-2, 4, \ldots$ for hologons with an even number of facets and a sequence of $1, n-1, 3, n-3, \ldots n, 2, n-2, 4, \ldots$ $$\frac{n+1}{2}$$

for hologons with an odd number of facets.

BRIEF DESCRIPTION OF THE DRAWINGS

In the accompanying drawings:

FIG. 9 graphically shows an example of cross scan error for a 14-faceted scanner where the exposure sequence is 1, 13, 3, 11, 5, 9, 7, 14, 2, 12, 4, 10, 6, 8, having a worst case adjacent facet error of 8 units.

FIG. 10 graphically shows an example of cross scan error for a 13-faceted scanner having an exposure sequence of 1, 12, 3, 10, 5, 8, 13, 2, 11, 4, 9, 6, 7, having a worst case adjacent facet error of seven units.

FIG. 11 graphically shows an example of a 14-faceted scanner, the cross scan error shown is both actual and low pass filtered by the eye or system response.

FIG. 12 illustrates a modified exposure sequence to reduce visibility of cross scan error by increasing the spatial frequency of the error.

DETAILED DESCRIPTION OF THE PREFERRED EMBODIMENT

Figure 1:
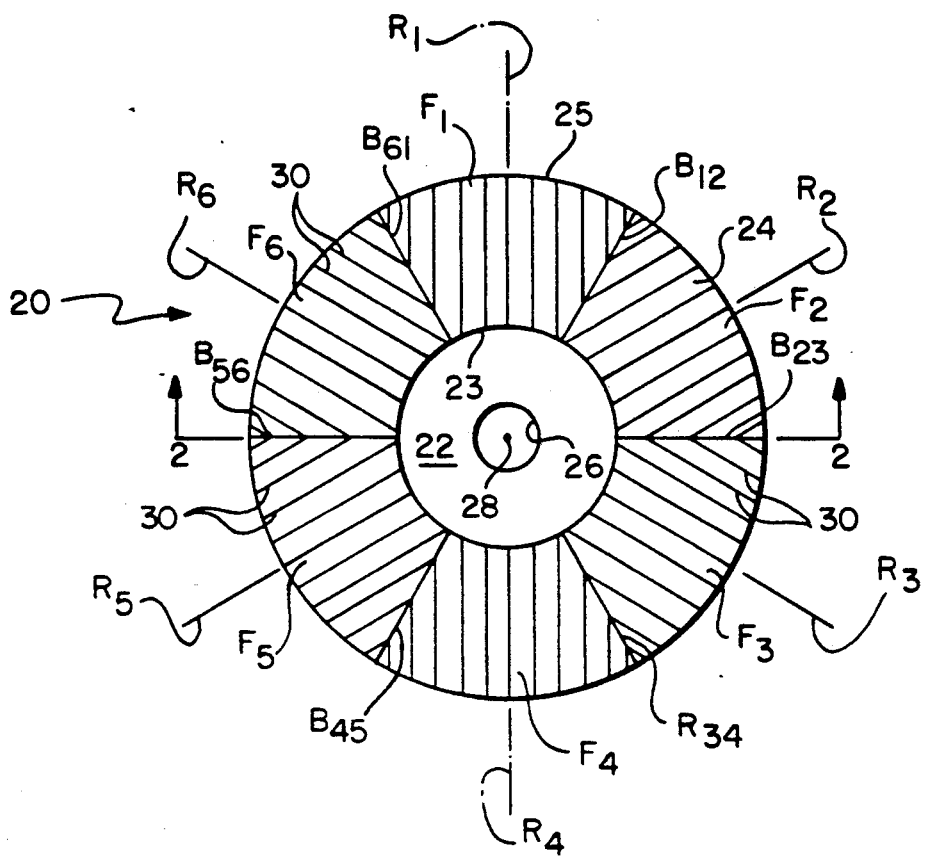
FIG. 1 represents a plan view of a hologon.
Figure 2:
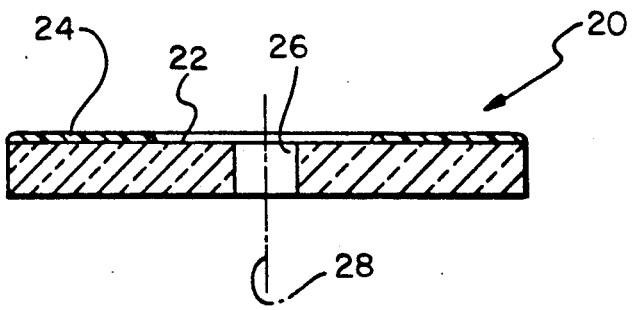
FIG. 2 is a cross-sectional view taken on line 2—2 in FIG. 1.

In FIGS. 1 and 2, there is illustrated a hologon 20 which comprises a glass disc 22 with a coating 24 of photoresist. The disc 22 has an aperture 26 coaxial with the geometric axis 28 of the disc 22, for receiving a drive shaft (not shown) to which the hologon is secured for rotation in unison with the shaft.

The hologon 20 illustrated in FIG. 1 has six facets $F_1$-$F_6$, each subtending an angle of 60° at the axis 28. There are radial boundaries $B_{12}$, $B_{23}$, $B_{34}$, $B_{45}$, $B_{56}$ and $B_{61}$ between the facets $F_1$ and $F_2$, $F_2$ and $F_3$ and so on, respectively. Each facet has a radially inner boundary 23 and a radially outer boundary 25 both of which are arcs of respective circles. The facets may be termed generally sector-shaped even though they are sectors truncated by the boundaries 23.

The photoresist coating 24 in each facet has been exposed and processed to exhibit a diffraction grating pattern. The diffraction grating is a plurality of straight, closely spaced lines 30 (only a very few of which are shown in the drawing) which, when light is incident on the grating, causes diffraction of the light. In the present example, the lines 30 in each facet $F_1$-$F_6$ are parallel to a line $R_1$-$R_6$, respectively, which is a radius bisecting the respective facet. In other examples, the lines in each facet are termed tangential and are perpendicular to the lines $R_1$-$R_6$ in each respective facet.

The diffraction grating lines 30 in each facet $F_1$-$F_6$ are formed by interfering two coherent beams so that an interference pattern is created on the photoresist. The interference pattern creates in the photoresist a latent image of a grating pattern. A mask limits the extent of the interference pattern. After one exposure, there is relative displacement so that another facet can be exposed. After all facets have been exposed, the photoresist is processed and the grating patterns result.

Figure 3:
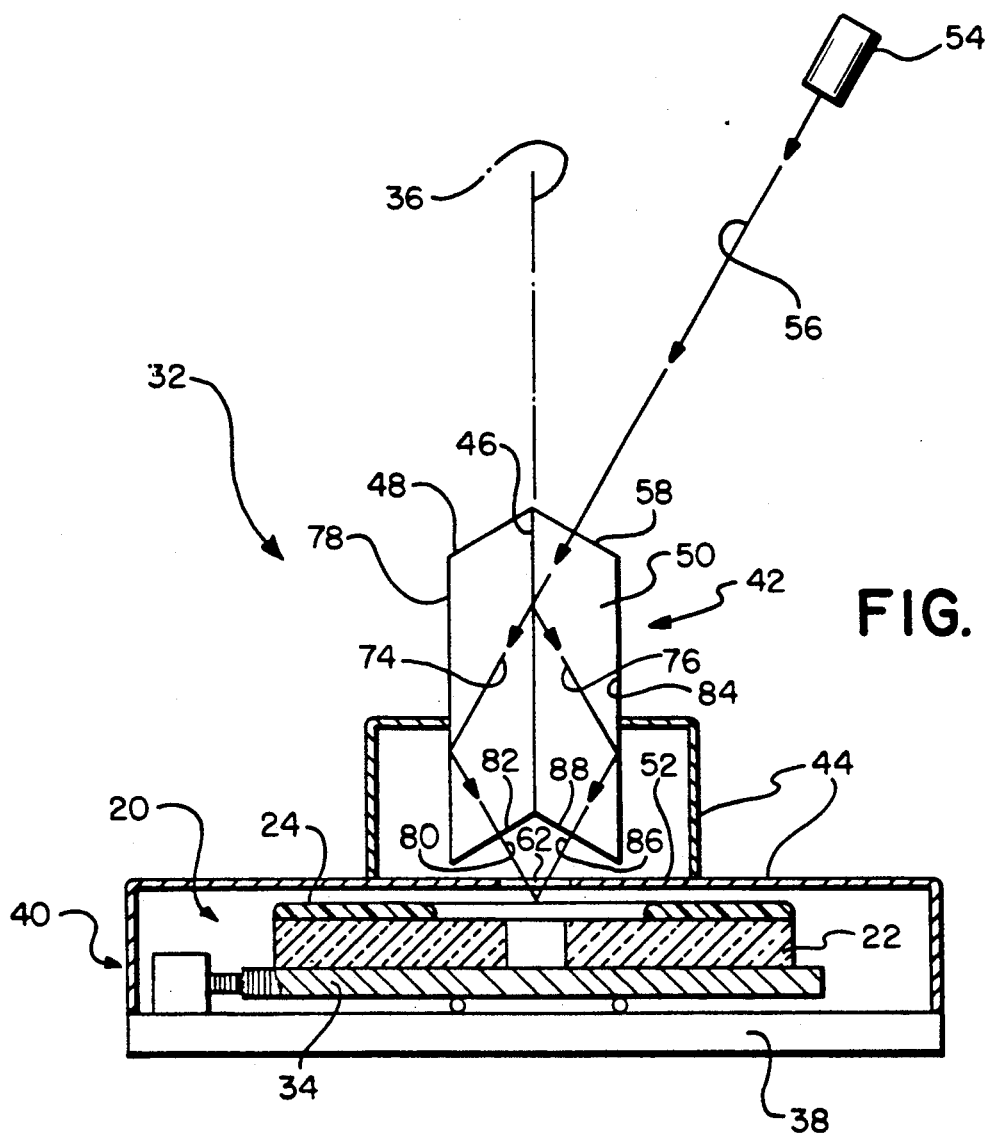
FIG. 3 is a schematic representation of an apparatus for manufacturing hologons.

FIG. 3 illustrates schematically an apparatus 32 for creating the grating pattern latent image in the photoresist coating 24. The apparatus includes a rotary table 34 mounted from a base 38, for rotation about an axis 36. Drive means 40 are provided for driving the table 34 in rotation and for holding it in desired positions.

A prism assembly 42 is mounted from the base 38 by support structure 44. The prism assembly 42 has a beam splitting interface 46 between two prisms 48 and 50. The plane of the interface 46 contains the axis 36.

A mask 52 is disposed between the prism assembly 42 and the disc 22 and is supported by the support structure 44.

A laser 54 provides a source of coherent, substantially monochromatic light which is directed as collimated beam 56 at a face 58 of the prism assembly 42.

Figure 4:
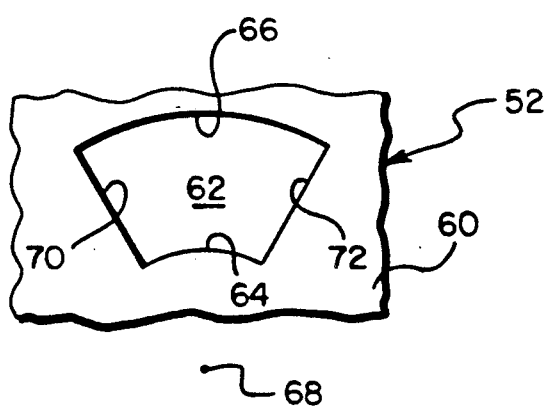
FIG. 4 is a view of a mask included in the apparatus illustrated in FIG. 3.

The mask 52 is illustrated in FIG. 4 and consists of an opaque plate 60 having an aperture 62. The aperture has a radially inner, smaller diameter circular arcuate boundary 64 and a larger diameter, radially outer circular arcuate boundary 66. The circular arcuate forms of the boundaries 64 and 66 have a common center 68. The other two boundaries 70 and 72 of the aperture 62, termed herein opposed lateral boundaries, are rectilinear and, as shown, are radial to the circular arcuate forms of the boundaries 64 and 66. The mask 52, supported by the supportive structure 44, is disposed with the center 68 on the axis 36.

For forming a hologon, a glass disc 22 with photoresist coating 24 thereon is positioned on the table 34. The laser 54 is energized and its output beam 56 enters the prism assembly 42 through face 58. The beam is incident on the interface 46 which splits the beam into beam 74 and beam 76. Beam 74 is reflected off face 78 and leaves the prism assembly 42, as beam 80, through face 82. Beam 76 is reflected off face 84 and leaves the prism assembly 42, as beam 86, through face 88.

The prism assembly 42 is so located and the beam 56 is of such cross-sectional size and shape that the beams 80 and 86 fill the aperture 62. The beams 80 and 86 interfere and form an interference pattern on the photoresist coating 24. The interference pattern is a plurality of bright and dark parallel lines which are parallel to the radius $R_1$ from the axis 36, which radius bisects the angle included between opposed lateral boundaries 70 and 72 of the aperture 62 in the mask 52. After an appropriate duration of exposure, the exposing beam 56 is interrupted by a shutter (not shown) and the drive means 40 is energized rotating the table 34 on the base 38. In the present example, the hologon to be produced has six facets, therefore, the drive means 40 rotates the table through exactly 60° i.e., (360/6)° and holds the table 34 in its new position. The exposure process is repeated and the table is again stepped.

Gratings in general and hologons in particular can be generated interferometrically (holographically) in photosensitive media to form either a volume grating or a surface relief grating. Both are fabricated by generating two laser beams and intersecting them at a specific angle to provide interference fringes. A photosensitive material on a suitable substrate is placed in the beams at the point of interference. The angle between the beams is varied to change the desired grating pitch.

In a volume grating, a material such as dichromated gelatin is coated as an emulsion on glass. When exposed to the laser and then developed, it exhibits regions of two different indices of refraction corresponding to the bright and dark bands of the interference pattern which provides exposed and non-exposed regions, respectively. These regions are distributed through the volume of the emulsion, and serve to diffract the laser beam when used in the writer equipment.

In a surface relief grating, photoresist is coated onto a glass substrate, exposed, and developed. In a typical photoresist, the emulsion hardens where exposed and remains after development. The resist in the unexposed areas is washed away. The result is a surface relief grating with regions of air and photoresist providing regions of two different indices of refraction.

Both types of gratings can be used to make hologons. Because either drift in the laser wavelength or the angle between interfering laser beams is the source of the cross scan error problem, performance of both types of gratings will be improved by the novel exposure method disclosed herein.

Figure 5:
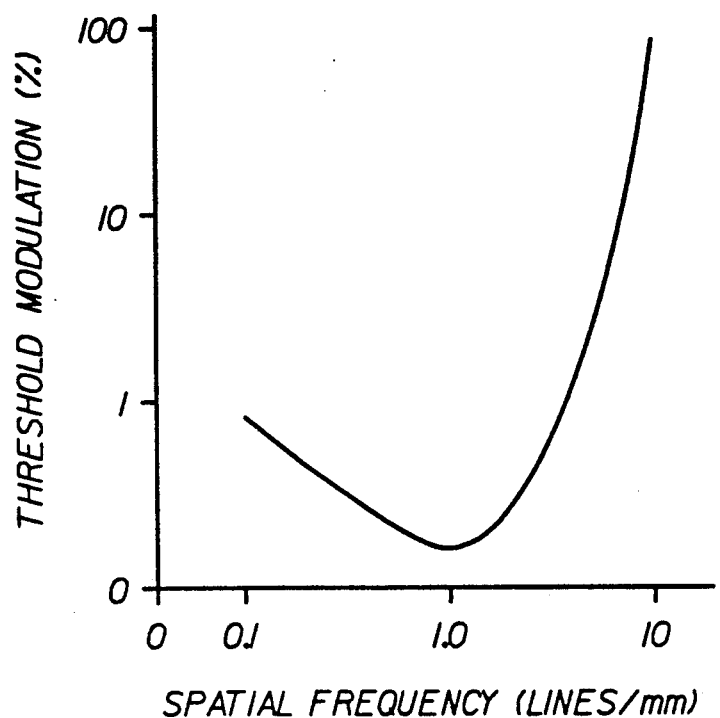
FIG. 5 shows the spatial frequency response of the human eye.

The observability of banding artifacts depends upon the spatial figuring of the banding pattern. The sensitivity of the human eye varies with spatial frequency as described by VanNes and Bouman "*Spatial Modulation Transfer in the Human Eye*", JOSA Vol. 57, No. 3, 1967. As seen in FIG. 5, the eye is fairly insensitive to both low and high spatial frequencies with its response being fairly good over the 0.1 lines/mm to 10 lines/mm range, peaking at about 1 line/mm. For example, two very closely spaced scan lines may give an appearance of a dark band because of the increased local exposure, while two lines more widely separated than normal may give the appearance of a light band because of reduced local exposure. Even though the line-to-line spatial frequency may be slightly above the sensitive range of the eye, the fact that the discontinuity occurs periodically with the once-around cycle rate of the scanner can allow the periodic error frequency to fall in the passband of the eye sensitivity. For example, a 10-faceted scanner writing at 12 lines/mm spacing will have a line-to-line rate just beyond the "normal" range for eye sensitivity. If the third facet, for example, causes a nonuniform line placement and the other facets do not, a discontinuity will occur at 1.2 lines/mm, very close to the peak eye response. It should be noted that it is not the average cross scan error but the worse case adjacent facet error that most aptly characterizes the problem.

Although facet-to-facet cross scan error for adjacent facets has the most effect on local exposure variation, average cross scan or pyramidal error is often quoted because it yields a lower value, but it should be recognized that one bad facet in an otherwise "perfect" 10-faceted scanner can have a low average error but still have objectionable banding. Peak-to-peak cross scan error is not the best way to characterize the amount of banding either, unless it happens to involve adjacent facets.

Figure 6:
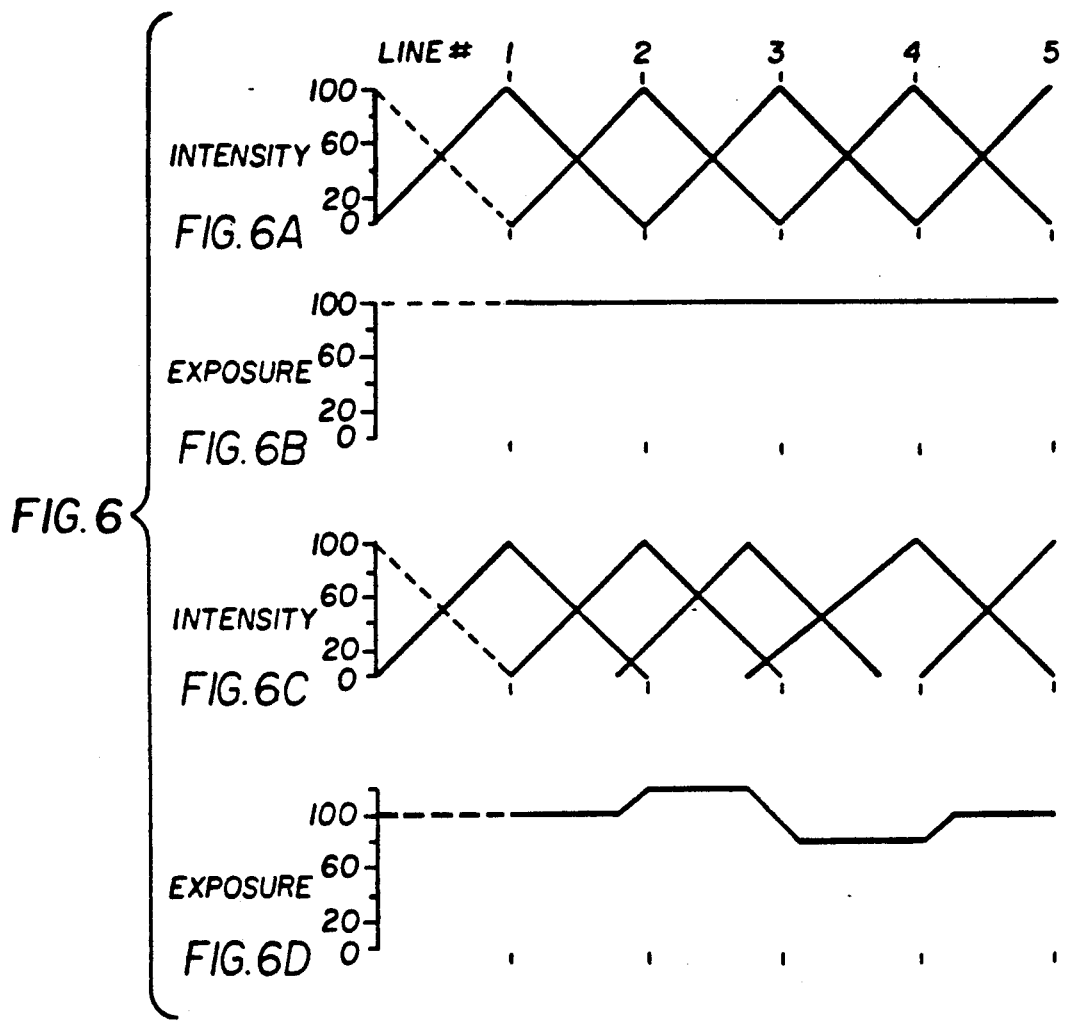
FIG. 6A shows the exposure profiles, line by line, where all facets are "perfect". The exposures for each shown plot with respect to arbitrary units of intensity from 0 to 100.
FIG. 6B shows the sequential line by line exposure resulting in a uniform exposure or gray field.
FIG. 6C illustrates the introduction of a cross scan error of 20% of a pixel or 1/5 of a line spacing such that the line from facet #3 is closer to the line from facet #2.
FIG. 6D illustrates graphically the effect of integrated exposure where the lines are closer together and the exposure rises by as much as 20%.

The adjacent facet cross scan error is the best descriptor of banding because it is the best indicator of exposure variation. For simplicity, assume that all facets of the scanner are "perfect" in both efficiency and beam pointing except facet 3 which exhibits known amounts of beam pointing (cross scan) error only. Further assume that a uniform gray field is being written and that the exposure profile is triangular—a reasonable approximation to the Gaussian profile normally encountered. FIG. 6A shows the exposure profiles, line-by-line, where all facets are "perfect". The exposure for each line is shown superimposed in arbitrary units from 0 to 100. To obtain the integrated exposure for any given location, the sequential line-by-line exposure must be added yielding the result in FIG. 6B of a uniform exposure or gray field. Of course, for a given photoreceptor, both the gamma and toe and shoulder nonlinearities should be taken into account to arrive at a transmittance or reflectance value.

Figure 7:
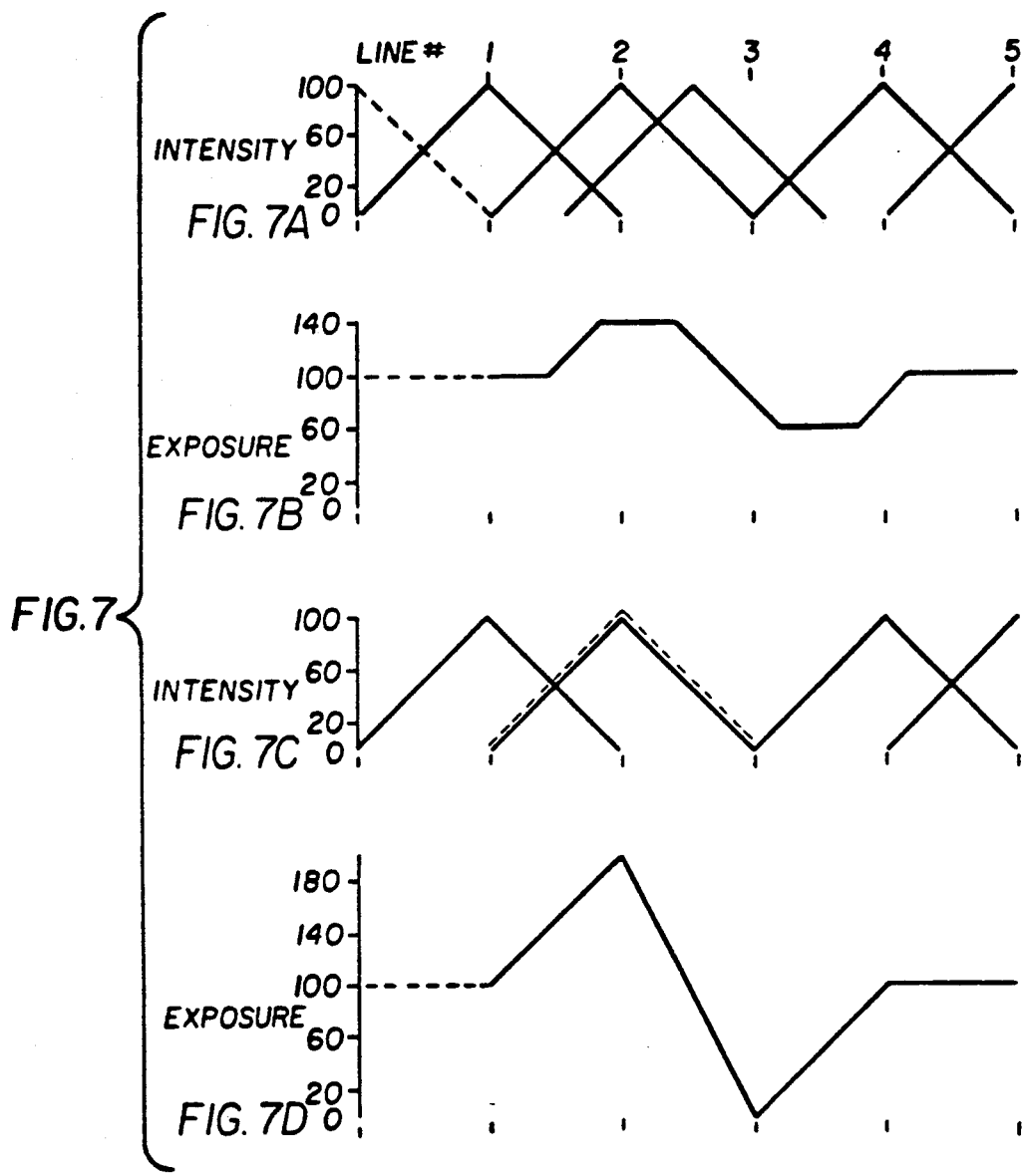
FIG. 7A illustrates a cross scan error of 40% of a pixel.
FIG. 7B illustrates an integrated exposure within variations of ±40% of nominal.
FIG. 7C illustrates a cross scan error of 100% of a pixel.
FIG. 7D illustrates the integrated exposure within variations ±100% of nominal when compared with FIG. 7B, it can be seen that as line placement error increases, the exposure variations increase.

FIG. 6C introduces a cross scan error of 20% of a pixel (1/5 of a line spacing) such that the line from facet 3 is closer to the line from facet 2. FIG. 6D shows the effect of integrated exposure. Where the lines are closer together, the exposure rises by as much as 20%. FIGS. 7A and 7C, respectively, illustrate cross scan errors of 40% and 100% of a pixel. FIGS. 7B and 7D show the integrated exposure within variations ±40% and ±100%, respectively, if nominal.

It should be noted that as line placement error increases, the exposure variations increase. Even if an individual discontinuity from such cross scan error is of too high a spatial frequency to be observable, the periodic once around error is likely to fall within the eyes' frequency range. The larger the exposure deviation, the more visible it becomes at any spatial frequency. FIGS. 6A through 7D illustrate how cross scan error in just one facet can cause visible banding and that the cross scan error between adjacent facets dominates the variation in exposure which produces the visible effect of banding.

Based on the foregoing illustrations, and the eye response curve (FIG. 5), if the cross scan error frequency can be maximized and the adjacent facet cross scan error kept to moderate levels, then the visibility of banding artifacts can be reduced. In the manufacture of hologons, one can reduce the adjacent facet cross scan error and increase the error frequency for a given process without reducing the average cross scan error for the disc. This means that the performance of the hologon in terms of visible banding can be improved without making major improvements in the hologon manufacturing process.

Figure 8:
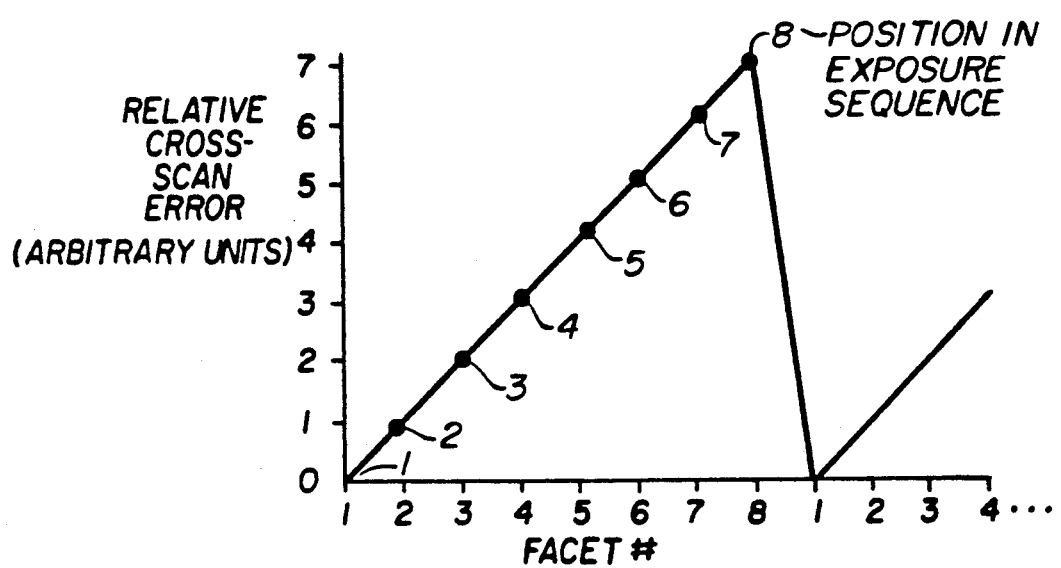
FIG. 8 graphically shows the cross scan error as a function of facet or exposure location for an 8-facet scanner.

As can be seen in FIG. 8, the cross scan error can show a repeatable trend from disc to disc. This Figure illustrates a ramp function where the cross scan error is arbitrarily set to zero for facet 1 and increases monotonically to the last facet, in this instance, facet 8. When such a hologon is used to write an image, the facet-to-facet cross scan discontinuities are small until facet 8 followed by facet 1, which has a large discontinuity in cross scan error and, therefore, a large variation in exposure. It has been determined that if the writing order of the facets could be rearranged such that facets 1 and 8 are not together, then the exposure variation could be reduced. One way to minimize the visibility of facet-to-facet variation is to generate a more smoothly varying function, such as a portion of a sinewave. Another way is to rearrange the error so that it occurs at a much higher frequency while still keeping adjacent facet variation low.

If the error is near the upper range of the eye's frequency response, and the frequency of the error can be increased, the banding will be reduced in visibility or may no longer be visible. Likewise, if there is an upper spatial frequency limitation elsewhere in the system, e.g., fused toner particle size in an electrophotographic system, when the banding frequency is above the cutoff frequency, it will no longer be visible. By modifying the exposure sequence of the hologon such that the spatial frequency of the cross scan error effects is increased, the banding artifacts can be reduced or eliminated. This reduction is accomplished by alternating facets with large cross scan error with those with small cross scan error relative to a specific facet. The difference in cross scan error between adjacent facets can be held to a moderate value by judicious selection.

The following is a generalized method for facet sequence selection:

In order to maximize the spatial frequency of the residual cross scan error, a facet with low error should be alternated or paired with a facet with large error. Arbitrarily classify half the errors as the lower group and the other half as the upper group. For hologons with an odd number of facets, put the extra error in the upper group. To minimize adjacent facet errors under this condition, a facet with very low error must be not adjacent to a facet with very high error. The differences in error between facet pairs (moving peak to peak average) should build gradually to a maximum and then decrease gradually to a minimum in order to avoid a large discontinuity between the first and last facet. This approach will yield a high spatial frequency for the error, whose envelope or moving average is a much lower, smoothly varying function that approximates a sinusoid whose frequency is the once around rate of the scanner. Having exposed facet one with the least error, expose the facets adjacent to facet one so that they exhibit the lowest error values from the upper group. Expose the facets adjacent to these facets so that they exhibit the lowest remaining error values from the lower group. Continue the exposure sequence around the disc such that facets alternate from low error to high error and that the average of the peak-to-peak error gradually increases in both directions from facet one to the opposite side of the disc, approximating a smoothly varying function. For hologons with an odd number of facets, the pairing of high and lower facets can't by fully maintained. Typically the median facet $$\left(\frac{n+1}{2}\right)$$

is the opposite facet with the highest error and the adjacent facet $$\left(\frac{n-1}{2}\right)$$

will have the next highest error.

Assuming a 14 faceted scanner and a ramplike error function (FIG. 8) facet 1 will be exposed first. Facets 14 and 2 are adjacent to facet 1 and should have high error and should be exposed such that they have the lowest error from the upper group of errors. Facets 13 and 3 are adjacent to these facets, should have low error, and should be exposed such that they have the lowest remaining error from the lower group. This pattern continues assigning error values to the facets until all facets and errors have been accounted for.

Certainly other sequences may prove acceptable to certain applications. Obviously, starting with high error and working gradually toward lower error will give equivalent results. These sequences need not be restricted to hologons. Any multifaceted scanner such as a polygon or pyramid which exhibits a repeatable error pattern in the manufacturing process such as that shown in FIG. 8 can be resequenced during manufacture to provide less visible banding.

This method of reducing cross scan error visibility assumes that the hologon manufacturing process has a repeatable error function, such as shown in FIG. 8. The function need not be a ramp, but simply one which repeatedly has a large adjacent facet error which can be reduced by reshuffling the exposure sequence. Of course, if the cross scan error as a function of facet exposure sequence is totally random from disc to disc, then the process is not well enough in control for this method to help. The underlying assumption is a well-controlled process with a repeatable error trend.

FIG. 11 shows the same 14-facet curve (solid line) as in FIG. 9. Overlaid is a dotted line which approximates the residual error assuming a high frequency rolloff. Such a rolloff could occur in the human eye response (FIG. 5) or from fused toner particles in an electrophotographic process, or other limitations in system MTF.

Table I presents exposure sequences for hologons where the spatial frequency of the error is maximized. The following sequences have been optimized to minimize the adjacent facet error as far as practical.

Table II shows how much the adjacent facet error was reduced by optimizing the exposure sequence. It also compares the peak-to-peak cross scan error for the uncorrected sequence with that of the filtered error as shown in FIG. 11.

In general, it appears that for hologons with an even number of facets, the worst case adjacent facet error can be reduced to $$\frac{n+2}{2}.$$

The spatial frequency of the error is multiplied by the factor n/2.

Thus, for a 14-faceted scanner, the error frequency can be multiplied by a factor of 7, thereby greatly reducing the eye's ability to detect banding problems, and the worst case adjacent facet error can be reduced from 13 to 8 units.

TABLE II-continued

| 10 | 6 | 9 | 9 | 4 |
| 12 | 7 | 11 | 11 | 5 |
| 14 | 8 | 13 | 13 | 6 |
| $\frac{n+2}{2}$ | $n-1$ | $n-1$ | $\frac{n-2}{2}$ |

| HOLOGONS WITH ODD NUMBER OF FACETS | | | | |
|---|---|---|---|---|
| Number of Facets | Adjacent Facet Error | | Peak to Peak Error | |
| | Optimized | Uncorrected | Uncorrected | Optimized, Filtered |
| 3 | 2 | 2 | 2 | 0.5 |
| 5 | 3 | 4 | 4 | 1.5 |
| 7 | 4 | 6 | 6 | 2.5 |
| 9 | 5 | 8 | 8 | 3.5 |
| 11 | 6 | 10 | 10 | 4.5 |
| 13 | 7 | 12 | 12 | 5.5 |
| $\frac{n+1}{2}$ | $n-1$ | $n-1$ | $\frac{n-2}{2}$ |

FIG. 12 shows an 8-faceted scanner with each facet numbered. Around the periphery of the disc is the position of each facet in the exposure sequence. Facet 1 is exposed first, facet 2 is sixth; facet 3 is third. To get the exposure sequence in the table, note that facet 1 is first, facet 7 is second, facet 3 is third giving 1, 7, 3, 5, 8, 2, 6, 4. This sequence will increase the cross scan error frequency by a factor of 4, while keeping the adjacent facet error moderate (5 units vs. 7 units for uncorrected sequence).

The method of determining the exposure sequence for a hologon with an even number of facets is:

TABLE I

| | Number of Facets | Optimized Exposure Sequence | Adjacent Facet Error Reduction Factor | Error Frequency Multiplier |
|---|---|---|---|---|
| | | HOLOGONS WITH EVEN NUMBER OF FACETS | | |
| | 4 | 1,3,4,2 | 3/3 | 2 |
| | 6 | 1,5,3,6,2,4 | 5/4 | 3 |
| | 8 | 1,7,3,5,8,2,6,4 | 7/5 | 4 |
| | 10 | 1,9,3,7,5,10,2,8,4,6 | 9/6 | 5 |
| | 12 | 1,11,3,9,5,7,12,2,10,4,8,6 | 11/7 | 6 |
| | 14 | 1,13,3,11,5,9,7,14,2,12,4,10,6,8 | 13/8 | 7 |
| General Form | n | 1,n − 1,3,n − 3, . . . , n,2,n − 2,4, . . . | $\frac{(n-1)}{(n/2)+1}$ | $\frac{n}{2}$ |
| | | HOLOGONS WITH ODD NUMBER OF FACETS | | |
| | 5 | 1,4,5,2,3 | 4/3 | 2 |
| | 7 | 1,6,3,7,2,5,4 | 6/4 | 3 |
| | 9 | 1,8,3,6,9,2,7,4,5 | 8/5 | 4 |
| | 11 | 1,10,3,8,5,11,2,9,4,7,6 | 10/6 | 5 |
| | 13 | 1,12,3,10,5,8,13,2,11,4,9,6,7 | 12/7 | 6 |
| General Form | n | 1,n − 1,3,n − 3, . . . , n,2,n − 2,4, . . . , $\frac{n+1}{2}$ | $\frac{n-1}{\frac{(n+1)}{2}}$ | $\frac{(n-1)}{2}$ |

Accordingly, it can be seen that hologons having large numbers of facets would be well suited to this method because of the large frequency multiplication factor.

TABLE II

| HOLOGONS WITH EVEN NUMBER OF FACETS | | | | |
|---|---|---|---|---|
| Number of Facets | Adjacent Facet Error | | Peak to Peak Error | |
| | Optimized (units) | Uncorrected (units) | Uncorrected (units) | Optimized, Filtered (units) |
| 4 | 3 | 3 | 3 | 1 |
| 6 | 4 | 5 | 5 | 2 |
| 8 | 5 | 7 | 7 | 3 |

1) Determine the shape of the cross scan error as a function of position in the exposure sequence (facet number) by fabricating and testing several hologons using an uncorrected exposure sequence (1, 2, 3, 4, 5, . . . , n). 2) Select the lowest error facet (or most negative error facet) as a reference.

3) Assign zero error to this facet (position in exposure sequence) making the entire error function positive. The graph is now cross scan error versus position in exposure sequence.

4) To make corrected hologons, expose facet 1 at the exposure sequence position which corresponds to zero error. For an increasing ramp function, the first exposure has zero error, and facet 1 would be exposed first.

5) Next assign the highest odd numbered facet to the exposure position with the least remaining cross scan error. For a ramp function, facet n−1 would be exposed second.

6) Assign the next lowest odd numbered facet to the exposure position with the lowest remaining error.

7) Keep selecting odd numbered facets by alternating between the lowest remaining and highest remaining until all the odd facets are used. Assign each facet to the exposure position with the lowest remaining cross scan error. For the ramp function, the sequence so far is 1, n−1, 3, n−3 . . . .

8) Then start selecting the even numbered facets beginning with the highest (n) and then the lowest (2), alternating between the highest remaining and the lowest remaining. Assign each facet to the exposure position with the lowest remaining cross scan error. Continue until all even facets are used.

The procedure for hologons with an odd number (total) of facets is similar except that the sequence starts with the lowest odd alternating with the highest even until the median facet number $$\frac{n+1}{2}.$$

is reached. This facet is not selected immediately, but set aside until last. Upon reaching, and setting aside, the median facet, the sequence switches to the highest odd (13) and alternates with the lowest even until the median is again reached, at which time it is selected.

It should be appreciated that other sequences or modifications of the sequences provided by those skilled in the art may yield equivalent or adequate results. For example, simply reversing the sequences given will provide equivalent performance. The sequences provided yield maximum spatial frequency with reduced adjacent facet error for any number of facets. Obviously, normalizing the cross scan error function to be entirely negative, or bipolar, before selecting a sequence will also yield suitable results.

Advantages and Industrial Applicability

This method of manufacturing is intended to maximize the spatial frequency of the error during the exposure sequence of the hologon. It is intended to work best with hologon scanners having a large number of facets so that the error frequency can be multiplied by a large factor, thereby greatly reducing the eye's ability to detect banding problems. This method also minimizes the adjacent facet error as far as is practical.

We claim:

1. A method of manufacturing hologon discs having a number of facets evenly spaced about the periphery of the disc and coated with a photosensitive material such that varying the exposure sequence of the facets based on error values obtained from previous studies are used to maximize the spatial frequency of the cross scan error while also reducing adjacent facet cross scan error, comprising the following steps:

a) arbitrarily select a facet on said disc and identify said facet as number one;

b) divide all facet error values obtained from previous studies into upper and lower groups with half the error values in the upper group and the other half of the error values in the lower group except for hologons having an odd number of facets then place the extra error value in the upper group;

c) expose facet number one so that it exhibits the lowest error value from the lower group;

d) alternately expose facets adjacent to the facet number one with the lowest error values in the upper group;

e) alternately expose the facets that are next adjacent to the last exposed facets with the remaining next lowest error values in the lower group;

f) continue the exposure pattern for facets next adjacent to the last exposed facets to the lowest error values remaining in the upper group;

repeat steps (e) and (f) until all facets have been exposed such that the magnitude of the moving average of the peak-to-peak error values about the disc approximate a smoothly varying function.

2. A method of manufacturing a multifaceted scanner element such as a hologon to maximize the spatial frequency of the cross scan error, said scanner element having an axis of rotation and an even number "n" of generally sector-shaped facets uniformly disposed about said axis, the scanner element being intended to have incident upon a substrate having a photosensitive layer receiving beams of radiation directed to said photosensitive layer to create an interference pattern on said layer in said sector-shaped facet; said method comprising:

rotating the hologon through angular steps of (360/n)°; and exposing said sector-shaped facets to said beams of radiation in the sequence of 1, n−1, 3, n−3, . . . n, 2, n−2, 4, . . . where the scanner element has an even number of facets.

3. A method of manufacturing a multifaceted scanner element having an odd number, "n", of facets to maximize the spatial frequency of the cross scan error, comprising the steps of:

providing a substrate having an axis about which the scanner element is rotated in use;

providing a photosensitive layer on said substrate;

directing beams of radiation at said photosensitive layer to create a first interference pattern on said layer to form in said layer a latent image of a diffraction grating;

masking said beams with a mask whereby said interference pattern is on only a preselected region of said layer having an arcuate segment of approximately (360/n)° measured at said axis;

relatively rotationally displacing said substrate and said beams and mask through angular steps of (360/n)° for exposure of the segments in the following sequence: 1, n−1, 3, n−3, . . . n, 2, n−2, 4, . .

$$\frac{n+1}{2}$$

where the scanner element has an odd number of facets until all of the facets have been exposed;

and processing said photosensitive layer whereby diffraction gratings are created in the photosensitive layer by the interference patterns.

4. The method as claimed in claim 2 where n equals 12, the exposure sequence is 1, 11, 3, 9, 5, 7, 12, 2, 10, 4, 8, 6.

5. A method as claimed in claim 3 wherein n equals 11, the exposure sequence is 1, 10, 3, 8, 5, 11, 2, 9, 4, 7, 6.

6. A method as claimed in claim 3 where n equals 13, the exposure sequence is 1, 12, 3, 10, 5, 8, 13, 2, 11, 4, 9, 6, 7.

7. A method of manufacturing a multifaceted scanner element to maximize the spatial frequency of the cross scan error, said scanner element having an axis of rotation and a number "n" greater than one, of generally sector-shaped facets uniformly disposed about said axis, the scanner element being intended to have incident upon it, at a radial distance "r" from said axis, a beam of radiation which is converted from stationary to scanning by rotations of the scanner element about said axis comprising:

providing a substrate;

providing a photosensitive layer on said substrate;

directing a beam of radiation at said photosensitive layer to create an interference pattern on said layer;

masking said beams with a mask having an aperture bounded in part by first and second bonding edges which are radial or approximately radial to said axis, the angle subtended at said axis by an arc at said radius "r" and extending between said first and second boundary edges occupying a generally sector-shaped region having an accurate extent, at said radius "r", subtending an angle of $(360/n)°$ at said axis;

relatively rotationally displacing said substrate and said beams and mask through angular steps of $(360/n)°$ for exposure of the segments in the following sequence of $1, n-1, 3, n-3, \ldots n, 2, n-2, 4, \ldots$ until all of the facets have been exposed;

and processing said photosensitive layer to form diffraction gratings.

8. A method as claimed in claim 7 where n equals 10 and the exposure sequence is 1, 9, 3, 7, 5, 10, 2, 8, 4, 6.

9. A method as claimed in claim 7 where n equals 14 and the exposure sequence is 1, 13, 3, 11, 5, 9, 7, 14, 2, 12, 4, 10, 6, 8.

10. A method as claimed in claim 7 where n equals 8 and the exposure sequence is 1, 7, 3, 5, 8, 2, 6, 4.

* * * * *